(12) United States Patent
Phillips

(10) Patent No.: US 6,656,557 B2
(45) Date of Patent: Dec. 2, 2003

(54) WATERPROOFING MEMBRANE AND METHOD OF MANUFACTURE

(75) Inventor: Aaron R. Phillips, Baxter Springs, KS (US)

(73) Assignee: Tamko Roofing Products, Inc., Joplin, MO (US)

( * ) Notice: Subject to any disclaimer, the term of this patent is extended or adjusted under 35 U.S.C. 154(b) by 0 days.

(21) Appl. No.: 09/879,315

(22) Filed: Jun. 12, 2001

(65) Prior Publication Data

US 2002/0009580 A1 Jan. 24, 2002

Related U.S. Application Data

(60) Continuation-in-part of application No. 09/487,091, filed on Jan. 19, 2000, now abandoned, which is a division of application No. 09/160,760, filed on Sep. 25, 1998, now abandoned.

(51) Int. Cl.$^7$ .............................................. B32B 33/00
(52) U.S. Cl. ...................... 428/40.3; 428/192; 428/337; 428/339; 428/351; 428/352; 52/420; 52/746.11
(58) Field of Search .............................. 428/40.1, 40.3, 428/98, 337, 339, 351, 352, 192; 52/420, 746.11

(56) References Cited

U.S. PATENT DOCUMENTS

| | | | | |
|---|---|---|---|---|
| 4,039,706 A | * | 8/1977 | Tajima et al. | 428/40 |
| 4,751,122 A | * | 6/1988 | May | 428/41 |
| 4,871,610 A | * | 10/1989 | Takata et al. | 428/246 |
| 5,096,759 A | * | 3/1992 | Simpson et al. | 428/40 |
| 5,981,010 A | * | 11/1999 | Terry et al. | 428/40.1 |

* cited by examiner

Primary Examiner—Erma Cameron
(74) Attorney, Agent, or Firm—Shook Hardy & Bacon

(57) ABSTRACT

A waterproofing membrane is provided which includes a waterproof synthetic resin film presenting opposed first and second surfaces, and an inner bitumen adhesive supported on the first surface of the film. The membrane is manufactured by heating the bitumen adhesive and applying it to a web of the waterproof synthetic resin film. As such, the resulting membrane includes an adhesive possessing a coating temperature at which the adhesive can be applied to the film as a viscous liquid, and a film possessing a still higher transition temperature that permits the film to function as a substrate for the bitumen adhesive during manufacture.

23 Claims, 2 Drawing Sheets

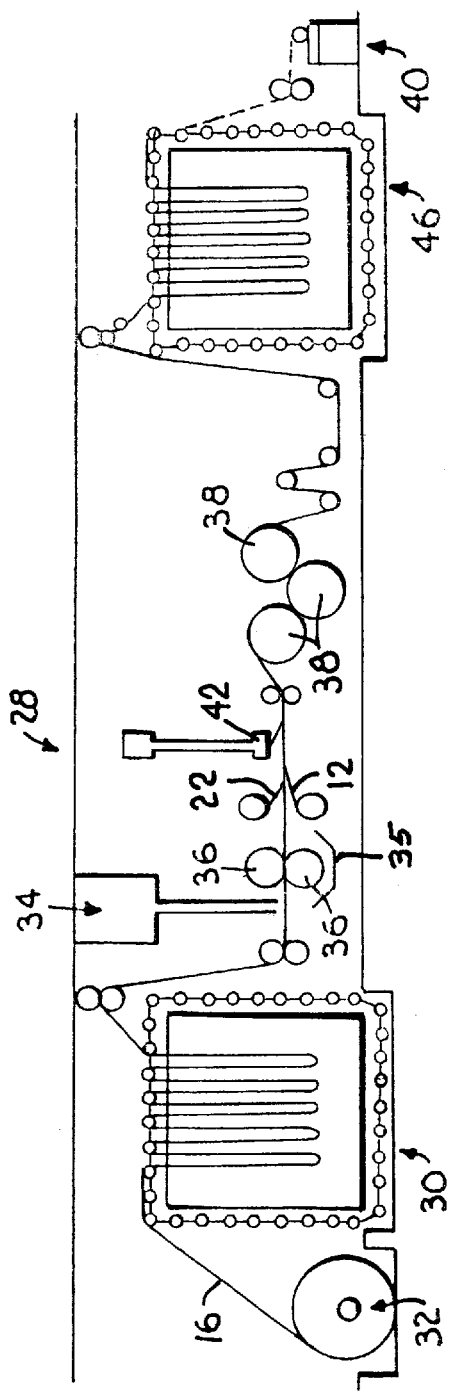
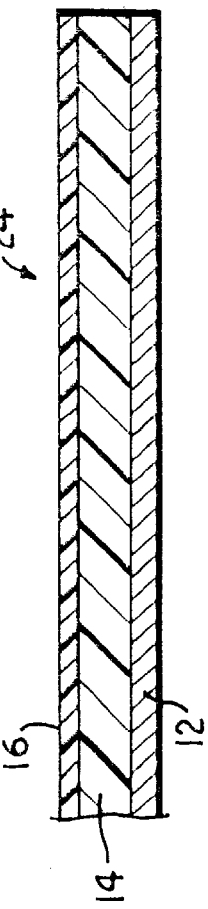
Fig. 3.
Fig. 4.

WATERPROOFING MEMBRANE AND METHOD OF MANUFACTURE

CROSS-REFERENCE TO RELATED APPLICATIONS

This is a continuation-in-part application claiming the benefit of U.S. patent application Ser. No. 09/487,091, Jan. 19, 2000, now abandoned, which is a divisional application claiming the benefit of U.S. patent application Ser. No. 09/160,760, filed Sep. 25, 1998 now abandoned.

STATEMENT REGARDING FEDERALLY SPONSORED RESEARCH OR DEVELOPMENT

Not Applicable.

BACKGROUND OF THE INVENTION

This invention relates generally to waterproofing membranes and, more particularly, to an improved waterproofing membrane employing a waterproof film on which a bitumen adhesive is supported, and to a method of manufacturing such membranes.

In the construction industry, it is known to provide waterproofing membranes of various constructions which can be adhered to the walls, floors, decks, etc. of a building to seal them against the passage of water and moisture therethrough. A typical waterproofing membrane comprises a layer of waterproof elastomeric or synthetic resin material or composition that is applied to a bitumen adhesive, e.g. of modified asphalt or the like, and may include additional layers to strengthen or support the various layers of the membrane during manufacture and use. As with any product, waterproofing membranes must perform their intended waterproofing function at the lowest possible cost, be easy to manufacture and use, and permit application to a multitude of different types of construction surfaces and to conform to varying substrate shapes.

A problem that arises in the use of conventional waterproofing membranes, especially in underground applications, is hydrolysis. Hydrolysis is a process whereby prolonged exposure of the waterproof material to moisture, typically standing water, leads to a deterioration of the membrane's ability to prevent the transmission of water. In an attempt to overcome the problems associated with hydrolysis, at least one known conventional membrane includes a waterproof layer incorporating high density polyethylene which is not vulnerable to hydrolysis. However, polyethylene possesses a relatively low transition temperature, above which both its dimensional stability and its ability to support a continuous load is lost relative to the dimensional stability and ability of the material to support a continuous load at room temperature.

Because this transition temperature of the material used in the waterproof layer is lower than the temperature at which the bitumen adhesive is capable of being extruded during manufacture, it is necessary to first extrude the adhesive onto a separate substrate, such as a release liner, allow the adhesive (asphalt) to cool to a temperature lower than the transition temperature of the waterproof layer, and subsequently apply the waterproof layer to the adhesive. The release liner is thus used as a substrate during the manufacturing process because it can support the weight of the adhesive at the coating temperature. Although it is possible to employ a waterproof layer that incorporates stabilizers or fillers such as glass fiber, mineral particles or the like to improve the mechanical properties of the material above its transition temperature, such compositions increase the cost of the membrane.

Several problems arise from the use of conventional membrane materials and methods of manufacture. For example, because the adhesive in the membrane must be allowed to cool before the waterproof layer can be applied during manufacture, large flat bed cooling devices are used, which consume a significant amount of space and provide only relatively slow convection cooling of the asphalt. As such, the manufacturing process is slow and expensive.

Other attempts to apply bitumen adhesive at high temperatures to a waterproofing film have been similarly unsuccessful. For example, attempts have been made to use roll coating techniques to apply bitumen to a waterproofing film. The bitumen is applied to a pair of rotating rolls on either side of the film, and subsequently transferred to the base sheet at the desired thickness. In these techniques, the rolls are internally cooled by circulating water so that the molten bitumen is cooled significantly before being applied to the film. Another techniques involving supporting the waterproofing film on a water-cooled conveyor belt has been considered, but has not proven effective. These methods involve additional process steps, equipment, and maintenance time. Ultimately, these methods are inefficient and result in a high cost conversion to produce the waterproofing membrane.

BRIEF SUMMARY OF THE INVENTION

It is an object of the present invention to provide a waterproofing membrane that can be used to waterproof a wall, floor, deck or the like, and that will not deteriorate substantially with time due to hydrolysis.

It is another object of the invention to provide a method of manufacturing the waterproofing membrane that reduces the total cost and time of manufacture of the membrane.

In accordance with these and other objects of the invention, a waterproofing membrane is provided which includes, possibly among other features, a waterproof synthetic resin film presenting opposed first and second surfaces, and a bitumen adhesive supported on the first surface of the film. The adhesive possesses a coating temperature at which the adhesive can be coated on the film as a viscous liquid, and the synthetic resin film possesses a transition temperature above which the dimensional stability of the film and the ability of the film to support a continuous load is substantially reduced, e.g. by at least 50% relative to the dimensional stability and ability of the film to support a continuous load at room temperature. The transition temperature of the film is higher than the coating temperature of the adhesive, permitting the film to be used as a substrate for the adhesive during manufacture.

By providing a construction in accordance with the present invention, numerous advantages are realized. For example, by employing a waterproof film of the type employed in the invention, it is possible to manufacture the membrane using a method comprising the steps of raising the temperature of a bitumen adhesive to a coating temperature, and coating at least one surface of a web of waterproof synthetic resin film with the adhesive. Thereafter, the coated web can be cooled by running it over one or more chilled rollers that employ conduction to cool the membrane to a temperature at which it can be rolled up for storage or shipment to a work site. Thus, the method is much faster than conventional methods, and cooling of the membrane can be done more efficiently, resulting in a lower cost membrane.

In accordance with one aspect of the invention, the membrane includes a pair of adhesive layers, each of which is applied to an opposing surface of the synthetic resin film. By providing this construction, added protection is afforded the film against exposure to moisture, improving the durability of the membrane and reducing the effects of hydrolysis. As such, it is possible to employ synthetic resin materials in the film that do not, by themselves, exhibit excellent resistance to the effects of hydrolysis.

In accordance with another aspect of the invention, the membrane includes, among other features, a waterproof synthetic resin film having a thickness of less than about 3 mils, wherein the bitumen adhesive supported on a first surface of the film presenting laterally spaced side edges that are substantially coextensive with the side edges of the film. As such, the membrane is capable of being wrapped around corners and over other odd shaped walls and floors, and adheres well to many different types of surfaces.

BRIEF DESCRIPTION OF THE SEVERAL VIEWS OF THE DRAWING

A preferred embodiment of the present invention will be described below with reference to the attached drawing, wherein:

FIG. 3 is a schematic view of a machine for manufacturing the first waterproofing membrane, illustrating the method of manufacture; and FIG. 4 is a cross-sectional view of a second waterproofing membrane constructed in accordance with an embodiment of the present invention.

DETAILED DESCRIPTION OF THE INVENTION

Figure 1:
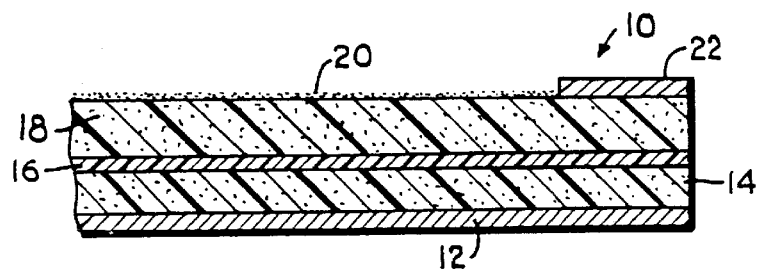
FIG. 1 is a cross-sectional view of a first waterproofing membrane constructed in accordance with one embodiment of the present invention.

As illustrated in FIG. 1, a waterproofing membrane 10 constructed in accordance with one embodiment of the present invention includes a release liner 12, a first or inner adhesive layer 14, a waterproof film 16, and a second or outer adhesive layer 18. In addition, a surface treatment 20 is applied over a majority of the exposed surface of the second adhesive layer, except along a marginal edge of the membrane over which a release liner 22 is applied.

The first and second adhesive layers 14, 18 are both preferably formed of a polymer-modified bitumen such as a styrene-butadiene-styrene (SBS) block polymer, and can include one or more fillers such as limestone or the like to provide the desired consistency and physical properties for use in the membrane. The adhesive possesses a coating temperature at which it can be coated on the film as a viscous liquid. For example, the coating temperature of the SBS block polymer-adhesive described falls generally in the range of about 330° F. to 365° F. Other adhesives may be used having other coating temperatures outside this range depending on the film utilized therewith. In addition to providing a tacky layer on the membrane for permitting adherence of the membrane to a floor or wall, the adhesive also resists water penetration, having a water permeability less than approximately 0.05 perm, where perm is the unit of measurement for permeance to water. Thus, the lamination of the film between the two adhesive layers substantially inhibits standing water from coming into direct contact with the film, substantially reducing deterioration of the film due to hydrolysis. By providing this construction, it is possible to employ materials for the film that would not otherwise be suitable candidates due to their poor ability to resist hydrolysis.

Figure 2:
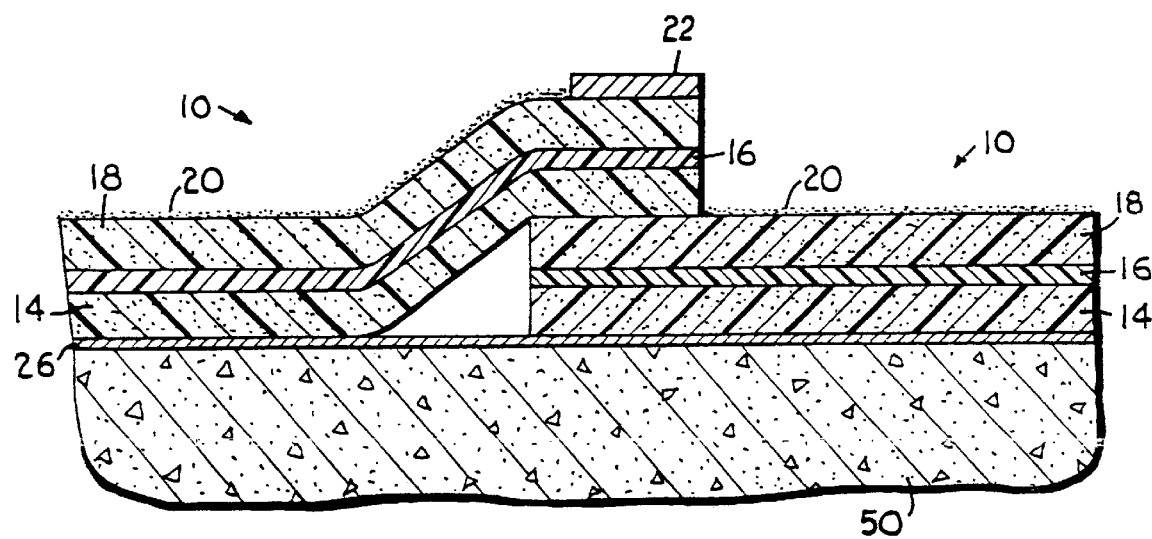
FIG. 2 is a cross-sectional view of a pair of the first membranes adhered to a wall that is to be waterproofed.

The release liners 12, 22 are conventional, and may be formed of a cellulose material such as paper that is coated with silicone or another suitable release material. The inner liner 12 is removably adhered to the exposed inner surface of the first adhesive layer 14, and is removable prior to application of the membrane on the surface to be waterproofed. The exposed surface of the second or outer adhesive layer 18 is covered with the non-adhesive surface treatment 20, which preferably includes silica, limestone, coal slag, talc, or the like. These fine mineral materials adhere readily to the adhesive to form a non-stick surface that is easy to handle during application to a surface to be waterproofed, and so that the membrane 10 can be rolled or stacked for storage and transportation. The nonadhesive surfacing 20 preferably covers a central area of the outer side adhesive layer 18, and the outer release liner 22 covers at least one marginal edge of the outer side adhesive layer 18. As illustrated in FIG. 2, the outer release liner 22 is removed from the marginal edges to expose the tacky exposed outer surface of the layer 18 so that an adjacent membrane 10 of similar construction can be placed over and adhered to the first membrane, forming a bonded overlap.

The waterproof film 16 is substantially impenetrable to water and moisture, preferably possessing a water permeability less than approximately 0.01 perm ($1 \times 10^{-2}$ perm). The film has a thickness of less than about 3 mils, permitting the membrane to be constructed of a thickness thin enough to facilitate its application around corners, over steps and onto surfaces of many varying shapes. The material used to make the film is a synthetic resin, preferably selected from the group consisting of polyester, polypropylene, polybutylene, polyimide, polycarbonate, polyamide, polyethylene, polystyrene, polyvinylchloride, flouroplastics, sulfone polymers, and polyvinylidene chloride, all of which maintain their dimensional stability and their ability to support a continuous load at bitumen adhesive coating temperatures. The most preferred material is polyester because of its current low cost, its ready availability in webs of film of the desired thickness, and its mechanical properties. Alternately, polyethylene or other film materials having poor mechanical properties and load bearing capacities above about 330° F. could be used if combined with additives or stabilizers that would improve the mechanical properties of the material at such elevated temperatures and allow use of the material in the inventive method. However, the cost of the membrane would be increased by adding such complexity, and should be avoided unless the advantages obtained by using such compositions outweighs the added cost thereof.

In order to determine whether a material is suitable for use in the film 16 of the membrane 10, it is necessary to determine whether the mechanical properties of the material and its load bearing capacity are maintained at the elevated temperatures at which the film is to be coated with the adhesive for the duration of the coating and cooling processes.

The transition temperature for the waterproof film must include a transition temperature that is at least higher than the coating temperature of the bitumen adhesive in a viscous form and preferably above the highest temperature at which the adhesive is to be applied to the film during manufacture so that the film 16 can serve as a support substrate for the adhesive layers 14, 18 without falling apart or irreversibly distorting during exposure to the elevated temperatures of the bitumen adhesive. One example of a readily available modified bitumen adhesive calls for a coating temperature of about 325° F. up to about 390° F. Other successful bitumen adhesives have been tested and were successfully applied to a film at temperatures as low as about 250° F. to about 320° F. Thus, selection of the waterproof film may vary accordingly.

Although it is preferred to employ a waterproof film that both includes a transition temperature greater than that mentioned above and which possesses excellent resistance to the effects of hydrolysis, it is possible to employ materials having less resistance to hydrolysis by sandwiching the film between two layers of the water resistant adhesive, as shown in FIG. 1. As such, the adhesive layers protect the film from exposure to moisture, prolonging the useful life of the membrane. However, as illustrated in FIG. 4, it is also possible with many suitable types of films 16 to employ only the first or inner adhesive layer 14, and to leave the exterior surface of the film 16 exposed. Such a membrane 24 does allow moisture to contact the film, resulting in accelerated deterioration of the material due to hydrolysis. Thus, by selecting a film having resistance to hydrolysis, this is not a problem.

With reference to FIG. 2, in order to waterproof a floor, wall or the like 50, the surface is preferably first cleaned and primed with a primer coating 26. After the primer coating has dried, the inner release liner 12 of the membrane 10 or 24 is peeled away from the inner adhesive layer, and the exposed surface of the adhesive is adhered to the surface. If the membrane 10 does not cover the entire surface, the overlap release liner 22 is removed from the membrane 10, and a second membrane 10 or 24 is applied with an edge of the second membrane overlapping the tacky edge of the first membrane to form a bonded overlap between the two membranes. The membranes are preferably overlapped by at least two inches, and if desired, the bond can be further sealed by application of an asphalt mastic, urethane sealant, or other appropriate material along the seam.

The membrane 10 or 24 is manufactured in a coating machine 28 as illustrated in FIG. 3. The waterproof film 16, which forms the substrate, is fed into one end of a dry looper 30 of the coating machine from a large diameter roll 32 preferably containing several thousand linear feet. The coating machine 28 heats the polymer-modified bitumen in a storage bin 34 to a coating temperature in the range of about 325° F. up to about 390° F. at which the bitumen is a viscous liquid capable of being applied to the web as a liquid coating. The heated bitumen is applied to the top of the sheet directly from storage bin 34 without cooling the molten bitumen. At this point in the process, the film is unsupported, and the viscous bitumen is supported by the film alone. The excess bitumen is subsequently removed by scraping (or other methods known in the art) so that the desired thickness of bitumen is located on the top of the sheet. Inking or coating rolls 36 are provided both above and below the web at a distance from the material outlet of the storage bin 34. The rolls 36 apply molten bitumen to the bottom of the sheet from a second storage bin 35 disposed below the substrate film 16. Because the bitumen is applied as a liquid to the web, the adhesive and film both present opposed lateral edge margins that are substantially coextensive. Only one side of the film is coated if a membrane of the type shown in FIG. 4 is to be manufactured.

In the manufacture of a membrane as shown in FIG. 1, the coated web leaves the coating rolls 36. The release liner 22 that provides for the exposed edges of the outer adhesive layer of the membrane, as well as the material for the nonadhesive surface treatment 20, are both preferably applied to the outer adhesive 18 prior to entering the group of water cooled drums 38. The nonadhesive surface treatment 20 is preferably dusted onto the exposed surface of the outer adhesive layer 18 by an applicator 42. The release liner 12 is also preferably applied to the exposed surface of the inner adhesive layer 14 prior to entering the group of water cooled drums 38. In the manufacture of a membrane as shown in FIG. 4, only release liner 12 is applied after exiting the coating rolls 36 and prior to entering the group of three cooling drums 38.

After application of necessary surfacing materials (release liner 22, nonadhesive surface treatment 20, and/or release liner 12), the membrane proceeds through a group of water cooled drums 38 or the like and a cooling looper 46 to cool the membrane to a temperature at which it can be accumulated into rolls and stored, e.g. at 40.

While preferred embodiments and particular applications of this invention have been shown and described, it is apparent to those skilled in the art that many other modifications and applications of this invention are possible without departing from the inventive concepts herein. It is understood that substitutions may be made and equivalents employed herein without departing from the scope of the invention as recited in the claims.

What is claimed is:

1. A waterproofing membrane comprising:
   a waterproof synthetic resin film presenting opposed first and second surfaces; and
   an inner bitumen adhesive supported on the first surface of the film, the adhesive possessing a coating temperature at which the adhesive is applied to the film as a liquid,
   the synthetic resin film possessing a transition temperature above which the dimensional stability of the film and the ability of the film to support a continuous load is substantially reduced relative to the dimensional stability and ability of the film to support a continuous load at room temperature, the transition temperature being higher than the coating temperature of the adhesive.

2. A waterproofing membrane as recited in claim 1, wherein the waterproof film has a thickness of less than 3 mils.

3. A waterproof membrane as recited in claim 1, wherein the film and inner bitumen adhesive each present a pair of laterally spaced side edges, wherein the side edges of the film are coextensive with the side edges of the inner bitumen adhesive.

4. A waterproof membrane as recited in claim 1, wherein the inner bitumen adhesive includes an exposed inner surface opposite the film, the membrane further comprising a protective release liner removably adhered to the exposed surface of the inner bitumen adhesive.

5. A waterproof membrane as recited in claim 1, wherein the inner bitumen adhesive is a polymer-modified asphalt.

6. A waterproof membrane as recited in claim 1, wherein the transition temperature of the film is greater than about 250° F.

7. A waterproof membrane as recited in claim 1, wherein the film comprises a water permeability less than approximately $1 \times 10^{-2}$ perm.

8. A waterproof membrane as recited in claim 1, wherein the film is formed of polyester.

9. A waterproof membrane as recited in claim 1, wherein the film is formed of a material selected from the group consisting of polyester, polypropylene, polybutylene, polyimide, polycarbonate, polyamide, polyethylene, polystyrene, polyvinylchloride, sulfone polymers, and polyvinylidene chloride.

10. A waterproof membrane as recited in claim 1, further comprising an outer bitumen adhesive supported on the second surface of the film, the outer bitumen adhesive possessing a coating temperature at which the adhesive is applied to the film as a liquid, the transition temperature of the film being greater than the coating temperatures of both the inner and outer bitumen adhesives.

11. A waterproof membrane as recited in claim 10, wherein the outer bitumen adhesive presents a plurality of marginal edges, the membrane further comprising a release liner covering at least one of the marginal edges of the outer bitumen adhesive.

12. A waterproof membrane as recited in claim 10, wherein the outer bitumen adhesive includes an exposed outer surface opposite the film, the membrane further comprising a nonadhesive material covering the exposed outer surface.

13. A waterproof membrane as recited in claim 11, wherein the outer bitumen adhesive includes an exposed outer surface opposite the film, the membrane further comprising a nonadhesive material covering the exposed outer surface that is not covered by the release liner.

14. A waterproof membrane as recited in claim 1, wherein the film is formed of a fluoroplastic material.

15. A waterproofing membrane comprising:
a waterproof synthetic resin film having a thickness of less than about 3 mils, the film presenting opposed first and second surfaces and laterally spaced side edges;
a bitumen adhesive supported on the first surface of the film and presenting an exposed surface and laterally spaced side edges that are coextensive with the side edges of the film, the adhesive possessing a coating temperature at which the adhesive is applied to the film as a liquid; and
a removable release liner covering the exposed surface of the adhesive;
the synthetic resin film possessing a transition temperature above which the dimensional stability of the film and the ability of the film to support a continuous load is substantially reduced relative to the dimensional stability and ability of the film to support a continuous load at room temperature, the transition temperature being higher than the coating temperature of the adhesive.

16. A waterproofing membrane comprising:
a waterproof synthetic film presenting opposed first and second surfaces, a bitumen adhesive supported on the first surface of the film and having an opposite bitumen adhesive surface therefrom, the adhesive possessing a coating temperature at which the adhesive is applied to the film as a liquid;
a release liner disposed on the opposite surface of the adhesive; and
the synthetic film possessing a transition temperature above which the dimensional stability of the film and the ability of the film to support a continuous load is substantially reduced relative to the dimensional stability and ability of the film to support a continuous load at room temperature, the transition temperature being higher than the coating temperature of the adhesive.

17. A waterproofing membrane as recited in claim 16, wherein the waterproof film has a thickness of less than 3 mils.

18. A waterproof membrane as recited in claim 16, wherein the bitumen adhesive is a polymer-modified asphalt.

19. A waterproof membrane as recited in claim 16, wherein the transition temperature of the film is greater than about 250° F.

20. A waterproof membrane as recited in claim 16, wherein the film comprises a water permeability less than approximately $1\times10^{-2}$ perm.

21. A waterproof membrane as recited in claim 16, wherein the film is formed of polyester.

22. A waterproof membrane as recited in claim 16, wherein the film is formed of a material selected from the group consisting of polyester, polypropylene, polybutylene, polyimide, polycarbonate, polyamide, polyethylene, polystyrene, polyvinylchloride, sulfone polymers, and polyvinylidene chloride.

23. A waterproof membrane as recited in claim 16, wherein the film is formed of a fluoroplastic material.

* * * * *